United States Patent
Ward et al.

(10) Patent No.: US 12,403,402 B1
(45) Date of Patent: Sep. 2, 2025

(54) MULTI-AGENT PLANNING SYSTEM FOR CONTROLLING NON-PLAYER AGENTS IN A GAME

(71) Applicant: Bitpart AI, Inc., Methuen, MA (US)

(72) Inventors: Christopher M. Ward, Somerville, MA (US); Trevor J. Santarra, Fremont, CA (US); Jeffrey D. Orkin, Arlington, MA (US); Sarah M. Rudzki, Methuen, MA (US)

(73) Assignee: Bitpart AI, Inc., Methuen, MA (US)

( * ) Notice: Subject to any disclaimer, the term of this patent is extended or adjusted under 35 U.S.C. 154(b) by 0 days.

(21) Appl. No.: 19/080,586

(22) Filed: Mar. 14, 2025

(51) Int. Cl.
| | | |
|---|---|---|
| A63F 13/60 | (2014.01) | |
| A63F 13/47 | (2014.01) | |
| A63F 13/55 | (2014.01) | |
| A63F 13/56 | (2014.01) | |
| A63F 13/57 | (2014.01) | |
| A63F 13/573 | (2014.01) | |
| A63F 13/67 | (2014.01) | |
| G06N 3/08 | (2023.01) | |

(Continued)

(52) U.S. Cl.
CPC .............. *A63F 13/60* (2014.09); *A63F 13/47* (2014.09); *A63F 13/55* (2014.09); *A63F 13/56* (2014.09); *A63F 13/57* (2014.09); *A63F 13/573* (2014.09); *A63F 13/67* (2014.09); *G06N 3/08* (2013.01); *G06N 20/00* (2019.01); *A63F 13/497* (2014.09); *A63F 13/65* (2014.09); *G06N 3/006* (2013.01)

(58) Field of Classification Search
CPC .......... A63F 13/47; A63F 13/67; A63F 13/56; A63F 13/57; A63F 13/60; A63F 13/65; A63F 13/55; A63F 13/573; A63F 13/497; G06N 3/08; G06N 3/006; G06N 20/00
See application file for complete search history.

(56) References Cited

U.S. PATENT DOCUMENTS

| | | | | |
|---|---|---|---|---|
| 7,454,399 B2* | 11/2008 | Matichuk | ............ | G06F 9/45512 |
| | | | | 706/14 |
| 8,082,220 B2* | 12/2011 | Hadad | ...................... | G06N 5/02 |
| | | | | 706/62 |

(Continued)

OTHER PUBLICATIONS

Kelly et al., "Planning with Hierarchical Task Networks in Video Games," 2007.
Nau et al., "SHOP2: An HTN Planning System," Journal of Artificial Intelligence Research 20 (2003).
Hoang et al., "Hierarchical Plan Representations for Encoding Strategic Game AI," Proceedings of the First Artificial Intelligence and Interactive Digital Entertainment, Jan. 2005.
Rich et al., "Collagen: A collaboration manager for software interface agents," User Modeling and User-Adaptive Interaction, Mar. 1999.

(Continued)

*Primary Examiner* — William H Mcculloch, Jr.
(74) *Attorney, Agent, or Firm* — David H. Judson (57) ABSTRACT

A method of managing a game platform. Using an authoring tool, a data set for a game narrative is generated. The data set includes transcripts that define tasks of non-player agents, such as Non-Player Character (NPC) agents, in a game session in which a player is operating under the control of a game engine. The data set is transformed into re-composable combinations of tasks structured as a multi-modal hierarchical network of tasks, wherein an individual path in the hierarchical network of tasks represents a plan that is a particular implementation of a task that having multiple ways of being implemented. During the game session, and using a director operating in association with the game engine, behaviors of one or more non-player agents are then orchestrated by receiving a set of observations occurring in the game and, in response, implementing a set of plans in the hierarchical network of tasks.

20 Claims, 9 Drawing Sheets

(51) Int. Cl.
  *G06N 20/00* (2019.01)
  *A63F 13/497* (2014.01)
  *A63F 13/65* (2014.01)
  *G06N 3/006* (2023.01)

(56) References Cited

U.S. PATENT DOCUMENTS

| | | | | |
|---|---|---|---|---|
| 8,862,614 | B2* | 10/2014 | Pradhan | G06F 16/245 |
| | | | | 707/769 |
| 9,827,496 | B1* | 11/2017 | Zinno | A63F 13/56 |
| 10,717,004 | B2* | 7/2020 | Buttner | G06T 13/00 |
| 10,888,785 | B2* | 1/2021 | Buttner | G06N 3/08 |
| 11,501,480 | B2* | 11/2022 | McIntyre-Kirwin | |
| | | | | G10L 13/027 |
| 12,090,399 | B2* | 9/2024 | Miyake | A63F 13/55 |
| 12,175,059 | B2* | 12/2024 | Choi | G06F 3/04886 |
| 12,330,066 | B1* | 6/2025 | Keppler | A63F 13/35 |
| 2005/0027495 | A1* | 2/2005 | Matichuk | G06F 9/45512 |
| | | | | 703/2 |
| 2007/0043803 | A1* | 2/2007 | Whitehouse | H04L 67/12 |
| | | | | 709/201 |
| 2009/0265299 | A1* | 10/2009 | Hadad | G06N 5/02 |
| | | | | 706/55 |
| 2013/0124561 | A1* | 5/2013 | Pradhan | G06F 16/25 |
| | | | | 707/769 |
| 2013/0185119 | A1* | 7/2013 | Palao | G06Q 10/0637 |
| | | | | 705/7.36 |
| 2019/0108448 | A1* | 4/2019 | O'Malia | G06N 3/04 |
| 2019/0381404 | A1* | 12/2019 | Buttner | A63F 13/60 |
| 2020/0050950 | A1* | 2/2020 | Hadad Segev | G06F 9/453 |
| 2020/0122038 | A1* | 4/2020 | Ebrahimi | G06N 3/045 |
| 2020/0122039 | A1* | 4/2020 | Meuleau | A63F 13/63 |
| 2022/0067385 | A1* | 3/2022 | Kaushik | G06V 20/47 |
| 2022/0148248 | A1* | 5/2022 | McIntyre-Kirwin | G06V 20/20 |
| 2023/0010100 | A1* | 1/2023 | Miyake | A63F 13/352 |
| 2023/0145369 | A1* | 5/2023 | McIntyre-Kirwin | G06F 3/011 |
| | | | | 345/473 |
| 2024/0424405 | A1* | 12/2024 | Rao | A63F 13/67 |
| 2025/0117727 | A1* | 4/2025 | Osborne | G06Q 10/06316 |
| 2025/0128171 | A1* | 4/2025 | McCoy | A63F 13/67 |

OTHER PUBLICATIONS

Orkin, "Three States and a Plan: The A.I. of F.E.A.R.," Proceedings of the Game Developers Conference (GDC), 2006.
Orkin, "Agent Architecture Considerations for Real-Time Planning in Games," Proceedings of the Artificial Intelligence and Interactive Digital Entertainment Conference (AIIDE), 2005.
Orkin, "Symbolic Representation of Game World State: Toward Real-Time Planning in Games," Proceedings of the AAAI Workshop on Challenges in Game AI, 2004.
Orkin, "Applying Goal-Oriented Action Planning to Games," AI Game Programming Wisdom 2, Charles River Media, 2003.
Orkin, "Collective artificial intelligence : simulated role-playing from crowdsourced data," PHD Thesis, MIT Media Lab, 2013.
Orkin et al., "Understanding Speech in Interactive Narratives with Crowdsourced Data," vol. 8 No. 1 (2012): Eighth Artificial Intelligence and Interactive Digital Entertainment Conference, Jun. 2021.
Orkin et al., "Semi-automatic task recognition for interactive narratives with EAT & Run," INT3 '10: Proceedings of the Intelligent Narrative Technologies III Workshop, Jun. 2010.
Orkin, et al., "Automatic Learning and Generation of Social Behavior from Collective Human Gameplay," Proceedings of the 8th International Conference on Autonomous Agents and Multiagent Systems (AAMAS), 2009.
Orkin, et al., "The Restaurant Game: Learning Social Behavior and Language from Thousands of Players Online," Journal of Game Development, 3(1), 39-60, 2007.

* cited by examiner

| CHARACTER | VERB | EVENT | DETAILS | UTTERANCE | STEP | TASK | METHOD INSTANCE | CONTEXT | CONTEXT INSTANCE |
|---|---|---|---|---|---|---|---|---|---|
| PERSON | SITS_ON | ACTION | {"object": "bar_stool", "context_object": "bar"} | | 1 | seat_self_at_bar | 1 | join_bar | 1 |
| SHERIFF | SPEAK_TO | SPEECH | {"targets": ["PERSON"], "utterance": "Afternoon."} | | 2 | greet_person | 2 | join_bar | 1 |
| PERSON | SPEAK_TO | SPEECH | {"targets": ["SHERIFF"], "utterance": "Afternoon Sheriff."} | | 3 | greet_person | 3 | join_bar | 1 |

FIG. 4

| | | | | | | |
|---|---|---|---|---|---|---|
| BARTENDER | SPEAK_TO | SPEECH | {"targets": ["PERSON"], "utterance": "What can I get you?"} | 15 | decline_order_drink | 5 | tend_bar | 3 |
| PERSON | SPEAK_TO | SPEECH | {"targets": ["BARTENDER"], "utterance": "Nothing for me, thank you ma'am."} | 16 | decline_order_drink | 5 | tend_bar | 3 |
| BARTENDER | SPEAK_TO | SPEECH | {"targets": ["PERSON"], "utterance": "What can I get you?"} | 17 | order_drink | 6 | tend_bar | 4 |
| PERSON | GIVE_ORDER | ACTION | {"items": ["whiskey"], "utterance": "I'll take a whiskey.", "target": "BARTENDER"} | 18 | order_drink | 6 | tend_bar | 4 |
| BARTENDER | SPEAK_TO | SPEECH | {"targets": ["PERSON"], "utterance": "Sure thing."} | 19 | order_drink | 6 | tend_bar | 4 |
| BARTENDER | PICKS_UP | ACTION | {"object": "lowball", "surface": "Shelf"} | 20 | make_whiskey | 7 | tend_bar | 4 |
| BARTENDER | PUTS_DOWN | ACTION | {"object": "lowball", "surface": "Prep_Area"} | 21 | make_whiskey | 7 | tend_bar | 4 |
| BARTENDER | PICKS_UP | ACTION | {"object": "Whiskey", "surface": "Shelf"} | 22 | make_whiskey | 7 | tend_bar | 4 |
| BARTENDER | POURS | ACTION | {"object": "Whiskey", "surface": "lowball"} | 23 | make_whiskey | 7 | tend_bar | 4 |
| BARTENDER | PUTS_DOWN | ACTION | {"object": "Whiskey", "surface": "Shelf"} | 24 | make_whiskey | 7 | tend_bar | 4 |
| BARTENDER | PICKS_UP | ACTION | {"object": "lowball", "surface": "Prep_Area"} | 25 | serve_drink | 8 | tend_bar | 4 |
| BARTENDER | PUTS_DOWN_FOR | ACTION | {"object": "lowball", "surface": "bar", "target": "PERSON"} | 26 | serve_drink | 8 | tend_bar | 4 |
| BARTENDER | SPEAK_TO | SPEECH | {"targets": ["PERSON"], "utterance": "Holler if I can get you something else."} | 27 | serve_drink | 8 | tend_bar | 4 |

FIG. 5

```
1   ;; Decline order task
2   (t_decline_order_drink
3     (m_decline_order_drink_001
4       (speak_to bartender person "What can I get you?")
5       (speak_to person bartender "Nothing for me, thank you ma'am.")))
6
7   ;; Order task
8   (t_order_drink
9     (m_order_drink_001
10      (speak_to bartender person "What can I get you?")
11      (speak_to person bartender "I'll take a whiskey.")
12      (speak_to bartender person "Sure thing.")))
13
14  ;; Make whiskey task
15  (t_make_whiskey
16    (m_make_whiskey_001
17      (picks_up bartender lowball shelf)
18      (puts_down bartender lowball prep_area)
19      (picks_up bartender whiskey shelf)
20      (pours bartender whiskey lowball)
21      (puts_down whiskey shelf)))
22
23  ;; Serve drink task
24  ...
25
26  ;; Tend bar task
27  (t_tend_bar
28    (m_tend_bar_001
29      (t_decline_order_drink))
30    (m_tend_bar_002
31      (t_order_drink)
32      (t_make_whiskey)
33      (t_serve_drink)))
```

FIG. 6

```
1  (PlanStructureConstraint
2    (TaskConstraint
3      (TaskPrefixConstraint
4        [(TaskConstraint
5          (TaskPrefixConstraint
6            [(MatchingActionConstraint (speak_to bartender person "What can I get you?"))
7             (MatchingActionConstraint (speak_to person bartender "I'll take a whiskey."))])])])))
```

| | TYPE | CHARACTER | VERB | EVENT | DETAILS | TASK | METHOD INSTANCE |
|---|---|---|---|---|---|---|---|
| 1 | STEP | | | | | | 0 |
| 2 | STEP | BARTENDER | PICKS_UP | ACTION | *object*: bottle_rum | make_cocktail | 0 |
| 3 | STEP | BARTENDER | POURS_INTO | ACTION | *object*: bottle_rum, *surface*: glass_hurricane | make_cocktail | 0 |
| 4 | STEP | BARTENDER | PUTS_DOWN | ACTION | *object*: bottle_rum, *surface*: barshelf | make_cocktail | 0 |
| 5 | STEP | BARTENDER | PICKS_UP | ACTION | *object*: bottle_ginger_ale | make_cocktail | 0 |
| 6 | STEP | BARTENDER | POURS_INTO | ACTION | *object*: bottle_ginger_ale, *surface*: glass_hurricane | make_cocktail | 0 |
| 7 | STEP | BARTENDER | PUTS_DOWN | ACTION | *object*: bottle_ginger_ale, *surface*: barshelf | make_cocktail | 0 |
| 8 | STEP | PLAYER | SPEAKS_TO | ACTION | *target*: BARTENDER, *utterance*: How's business tonight? | chitchat_with_bartender | 1 |
| 9 | STEP | BARTENDER | SPEAKS_TO | ACTION | *target*: PLAYER, *utterance*: Not bad, not bad at all. Busy night keeps me on my toes. | chitchat_with_bartender | 1 |
| 10 | STEP | PLAYER | SPEAKS_TO | ACTION | *target*: BARTENDER, *utterance*: Been working here long? | chitchat_with_bartender | 1 |
| 11 | STEP | BARTENDER | SPEAKS_TO | ACTION | *target*: PLAYER, *utterance*: Long enough to know all the regulars by name and their usual drinks. | chitchat_with_bartender | 1 |

FIG. 9

MULTI-AGENT PLANNING SYSTEM FOR CONTROLLING NON-PLAYER AGENTS IN A GAME

BACKGROUND

The subject matter herein relates generally automated planning systems in games, such as single- or multi-player games that operate over network systems, including over the Internet. As well-known, games of this type run in game platforms that include a "game engine." A game engine is a software framework specifically designed for developing video games, providing developers with a set of tools and functionalities to create various aspects of a game, including graphics rendering, physics simulation, sound, AI (Artificial Intelligence) interactivity, networking (when multiple players are involved), and more, essentially acting as a foundation to build a game upon without a game developer having to code everything from scratch. In a typical game session, a "player"—the in-game representation of the human being playing the game-interacts in a virtual world including with so-called non-player (or playable) characters (NPCs). An NPC is a character in a game that is not controlled by a player. In video games, this usually means a character controlled by the computer (instead of a player) that has a predetermined set of behaviors that potentially will impact gameplay. More generally, an NPC is one type of entity in the virtual world that can receive instructions (sometimes referred to as "cues") from a control element (as opposed to the player), and take some action or activity in response. Other such entity types may be inanimate objects or characteristics of the virtual world itself (e.g., camera angles, music, weather, object effects, and many more) that like NPCs are capable of being controlled independently of what the player does. Collectively, these entities are sometimes known as "agents."

While gaming technologies such as referenced above represent a mature industry and provide many benefits, content creation for gameplay in video games remains a significant challenge, especially for game narratives that involve potential player interactions with multiple agents. While the game engine manages the elements in the virtual world in which the player is interacting, the player is under the control of the end user playing the game. What the player will do at any given time and in response to whatever stimulus that is happening in the game is difficult to script out in advance. The player interacts with props in the environment, and there are usually many possible narrative threads that may be followed. The problem is exacerbated when trying to plan and manage multi-agent behavior, where multiple characters (some of which may be AI-generated) must make decisions and interact seamlessly within a shared game world. Given the complexity of designing and implementing content narratives for such game environments, prior art techniques and methods typically require that game designers have significant technical expertise. The process is also very time consuming and expensive. Moreover, known solutions that incorporate NPC interactivity provide only basic and simplistic interactivity, e.g., just interaction with a single NPC at time, and no ability to cast multiple NPCs that interact with each other (and the player).

Recently, game companies and designers have begun to leverage AI-based solutions (such as Large Language Models (LLMs)) to facilitate game content creation. While AI does enable content generation solutions that provide for more robust planning of game-based interactivity (including with NPCs), it does not provide for the ability to efficiently script and run-time implement narratives for multi-agent scenarios.

SUMMARY

This disclosure provides tools and methods to game designers and others by which they can create and scale casts of autonomous, multi-agent entities, e.g., a set of NPCs that interact conversationally and physically with each other and with a human player, and their associated virtual game environment. The approach herein increases the amount of creative options and iterations for technical visualization while minimizing the amount of trial and error that needs to be taken during production. As a result, the amount of time needed for designers to create and simulate gameplay is significantly reduced and is achieved without significant technical resources or expertise. Further, the information generated during content creation process is then readily processed into a form that is optimized to efficiently manage multiple agents within a virtual world environment.

According to one aspect, this disclosure provides a method of managing a game platform. Using an authoring tool, a data set for a game narrative is generated. The data set includes transcripts that define tasks of non-player agents, such as Non-Player Character (NPC) agents, in a game session in which a player is operating under the control of a game engine. According to the method, the data set is transformed into re-composable combinations of tasks structured as a multi-modal hierarchical network of tasks, wherein an individual path in the hierarchical network of tasks represents a "plan" that is a particular implementation of a task having multiple ways of being implemented. During the game session, and using a director operating in association with the game engine, behaviors of one or more non-player agents are then orchestrated by the director receiving a set of observations occurring in the game and, in response, implementing a set of plans in the hierarchical network of tasks. In this manner, and in a preferred embodiment, a set of NPCs are controlled to interact conversationally and physically with each other, the player, and the virtual game environment.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF DRAWINGS

For a more complete understanding of the subject matter herein and the advantages thereof, reference is now made to the following descriptions taken in conjunction with the accompanying drawings, in which.

DETAILED DESCRIPTION

By way of background, the techniques herein are designed to interoperate with a game engine. As known, a game engine is a software framework specifically designed for developing video games, providing developers with a set of tools and functionalities to create various aspects of a game, including graphics rendering, physics simulation, sound, AI interactivity, networking, and more. Example game engines include Unity™, Unreal Engine™, Roblox™ and others. Unity is a cross-platform game engine developed by Unity Technologies, and it is used to create three-dimensional (3D) and two-dimensional (2D) games, as well as interactive simulations. Unreal Engine (UE) is a 3D computer graphics game engine developed by Epic Games. Roblox is an online game platform and game creation system developed by Roblox Corporation that allows users to program and play games created by themselves or other users. The above commercial products and systems are not intended to be limited, and the approach herein is designed to work with any game engine. Further, while the techniques of this disclosure are designed to inter-operate (and control) a game engine, typically the game engine itself is not part of the multi-agent planning system.

Figure 1:
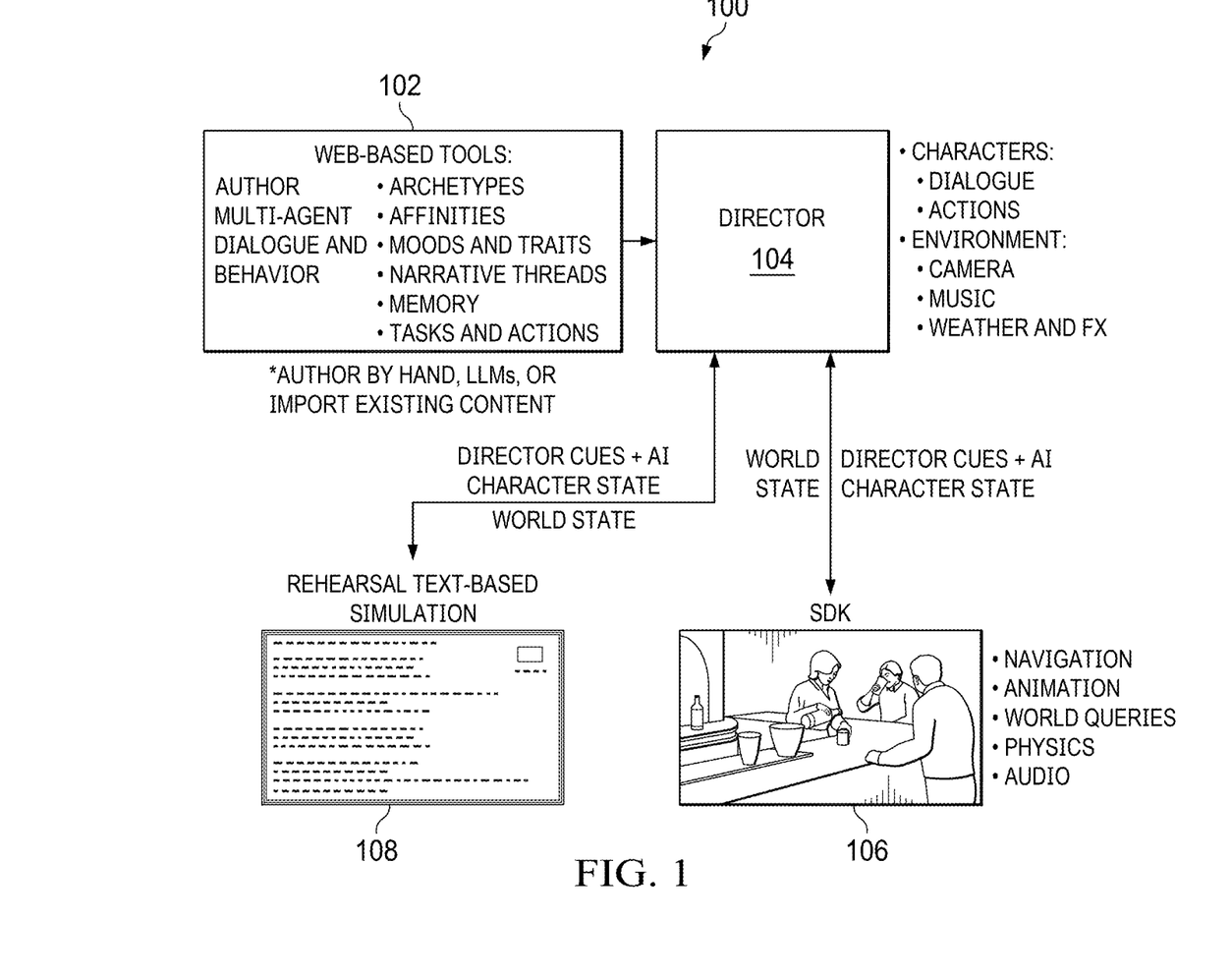
FIG. 1 is a high level overview of an operating environment in which the techniques of this disclosure are implemented.

Referring now to FIG. 1, a high level depiction of an end-to-end ecosystem 100 in which the techniques of this disclosure are practiced is depicted. In one example embodiment, the ecosystem includes an authoring component 102, a director component 104, a Software Development Kit (SDK) component 106 (that runs in association with an actual game engine 107), and a text-based simulation (a rehearsal) component 108. As also shown, the SDK component 106 and game engine 107 typically execute in game client, such as an end user machine 110. In one embodiment, the authoring component 102 is web-based, although the functionality may also be provided as a standalone process or component of another content creation or management platform. As will be described, the authoring component (tool) enables users (including non-technical game design team members) to author behavior, dialogue, and multi-agent scenes in an intuitive format akin to screenwriting. The director component 104 is the primary runtime (in-game) controller, as it communicates and interoperates with the player's experience in a game (either via the SDK component 106 integrated with the game engine, or a text-based simulation running in the Rehearsal component 108) to provide control signaling for the game engine. In a preferred embodiment, the director component 104 is cloud-based, although this is not a requirement. In operation, and with the director being cloud-accessible, the game client uses HTTP requests to a RESTful API to send "world state" snapshots and action observations from the game client to the director component. And the director responds with control signaling (one or more cues) that orchestrate the navigation, actions and dialogue of a cast of NPCs, as well as activities of other disembodied agents that may also be present in the environment. Preferably, the SDK 106 is tightly integrated with the game engine 107 and thus leverage's the engine's native functionality for navigation, animation, physics, world queries and audio. In an alternative embodiment, the SDK functionality is custom built into the game engine itself.

According to a first aspect of this disclosure, the authoring tool enables game designers to implement (via the director) sophisticated control over narrative during a game session. To this end, the web-based authoring tool 102 enables even non-technical team members to author behavior, dialogue, and multi-agent scenes in an intuitive format akin to screenwriting. Users may optionally leverage Large Language Models (LLMs) to write additional content, or vary existing content. A representative LLM that may be used for this purpose in Anthropic Claude, but users may choose to reference different or multiple LLMs, or none at all.

Preferably, the authoring tool enables designers to work with two (2) primary data formats, referred to herein as "transcripts" and "threads." In one practical embodiment, transcripts look like spreadsheet representations of a script for a performance. Each transcript provides a linear fragment of a larger narrative, and the contents of a transcript represents one or more tasks. The threads format represents how a sequence of tasks unfolds over a (possibly) large non-consecutive period of time. More formally, and as will be described in more detail below, a transcript represents a portion of a narrative and comprises a set of one or more items (e.g., rows of a data table), with each item in the transcript comprising one of: an action, a line of dialogue, a reference to a task in the transcript or another transcript, and combinations thereof. The items are configured in a sequence. In this paradigm, a "task" is subset of the set of items and typically involves actions/actuations of multiple agents. As will be seen, the authoring tool herein provides a way for content authors (which may be human beings or AI-based automation) to "annotate" (select) particular items (thereby constituting the "subset") that will form a particular task. The selected items maintain their original sequence (although it is not required that a subset comprise a contiguous set of items in the sequence). There may also be many different ways to implement a task that is represented by the subset of items. A thread comprises non-consecutive sequences of tasks associated with a time period, which itself may be consecutive or non-consecutive. Typically, and as will be described, a thread enforces one or more constraints on implementation of one or more tasks.

Using the authoring tool or other automation (e.g., an LLM) to apply annotations that create tasks, a data set of linear narrative fragments is transformed into structured hierarchical tasks that can be recomposed in near infinite configurations within a hierarchical planning system that powers the director at runtime. As will be described, and according to a further aspect of this disclosure, a planning system leverages an HTN (Hierarchical Task Network) that is modified to be data-driven, multi-modal (physical and dialogue acts), and large scale, with significantly more game content than is available with existing solution. In AI, hierarchical task network (HTN) planning is an approach to automated planning in which the dependency among actions can be given in the form of hierarchically structured networks. Planning problems are specified in the hierarchical task network approach by providing a set of tasks, which can be: primitive (initial state) tasks; compound tasks (intermediate state), which can be seen as composed of a set of simpler tasks; and goal tasks (goal state). A solution to an HTN problem is then an executable sequence of primitive tasks that can be obtained from the initial task network by decomposing compound tasks into their set of simpler tasks, and by inserting ordering constraints. Constraints among tasks are expressed in the form of networks, called (hierarchical) task networks. A task network is a set of tasks and constraints among them. Such a network can be used as the precondition for another compound or goal task to be feasible.

The text-based simulation component 108 operates on symbolic world state representations without assets or other 2D or 3D representations of a game world. By leveraging this component, content designers can test and iterate the content generation without the dependency on the production of a fully-realized 2D or 3D game world. This significantly increases productivity of content creators by decoupling content creation from the crafting of the 2D or 3D game world.

According to another aspect of this disclosure, the problem of scripting and controlling multi-agent behavior, where multiple characters must make decisions and interact seamlessly within a shared game world, leverages HTN planning for multi-modal (both dialogue and action) behaviors. HTN planning offers a powerful method for structuring these interactions, thereby providing a framework that balances both flexibility and control. In particular, and by adapting HTNs to multi-agent systems, the techniques of this disclosure enables creation of structured content that orchestrates the actions of multiple characters (and the human player(s)) while remaining adaptable to a dynamic game world. As will be seen, the system can reason about goals and contingencies in real-time, allowing for a more nuanced and responsive game experience.

Figure 2:
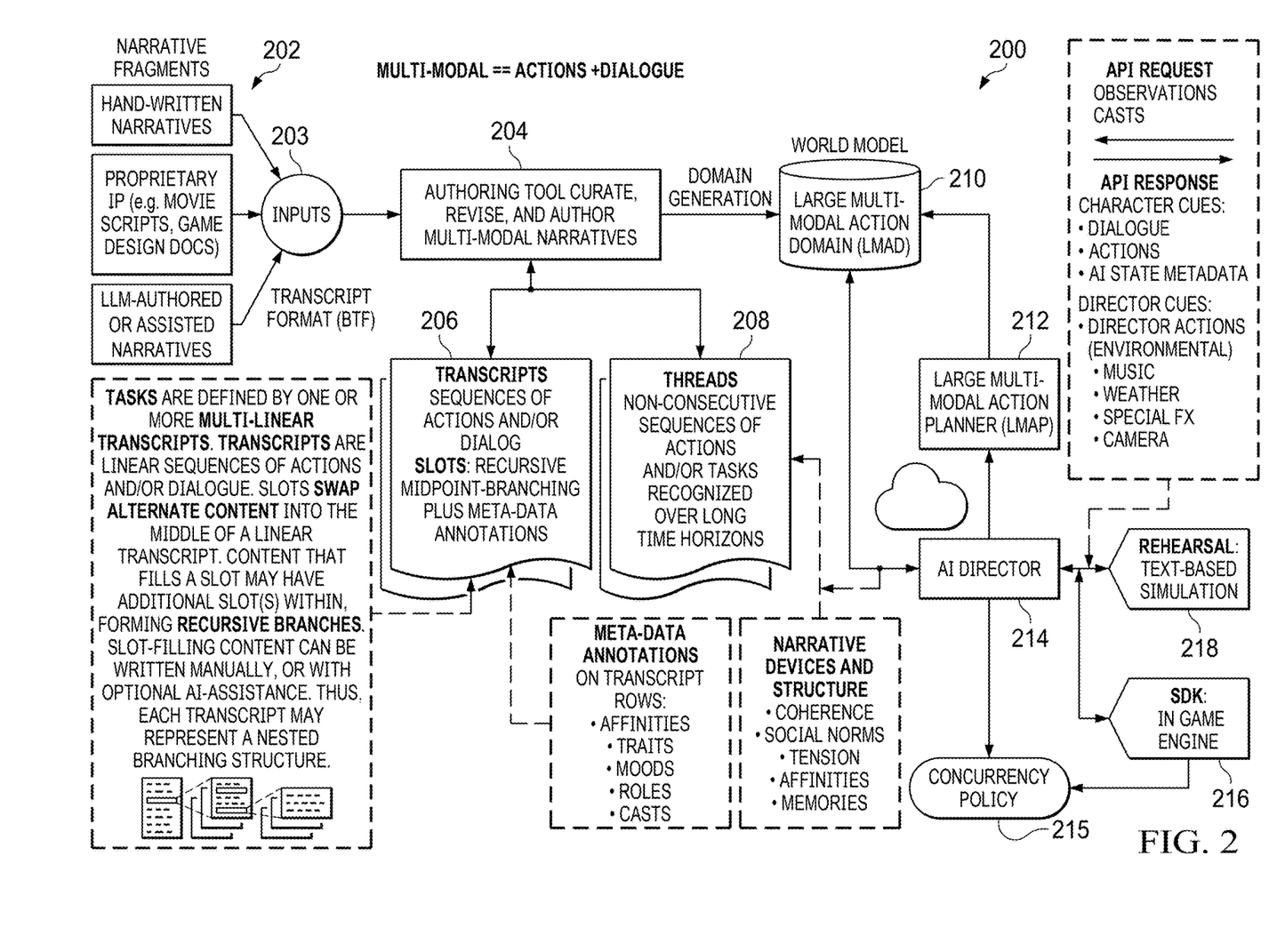
FIG. 2 is a flowchart depicting the content creation and game control workflow of an end-to-end system that implements the techniques herein.

FIG. 2 depicts a particular implementation of a workflow that provides for multi-agent planning for narrative content according to this disclosure. As will be seen, the notion of "planning" also includes the runtime implementation of the director. The approach enables the creation of and control over multi-agent behavior in games, preferably utilizing HTN planning for multi-modal actions including dialogue, movement, and object interactions. And, according to another benefit, such behavior may involve concurrency, wherein agents perform multiple task simultaneously. Behavioral concurrency involves not only consideration of multiple actions of a single character but also parallel behaviors of a cast of many characters. Using the authoring tool, designers structure complex (often concurrent) behaviors between and among agents in dynamic, narrative-driven environment, allowing NPCs to make real-time decisions and engage in meaningful interactions with player(s). As a result, the approach enables developers to create responsive, immersive worlds where characters act naturally and enrich the player experience.

Viewed from left-to-right, the system flow 200 begins with a set of inputs 203 from various sources 202 of narrative fragments, such as hand-written narratives, proprietary narratives (scripts, game design documents, etc.) and LLM-authored or assisted narratives. Using the authoring tool, at step 204 the author curates, revises and authors a set of one or more multi-modal narrative(s), where the notion of multi-modal typically refers to both dialogue and action. As depicted, the authoring function (step 204) leverages transcripts 206 and threads 208.

As noted above, transcripts comprise sequences (e.g., in the form of rows) of actions and/or dialogue that together comprise a linear narrative, and at step 204 the authoring tool is used to apply meta-data annotations on transcript rows to thereby define one or more tasks. The annotations may also define character affinities, traits, moods, roles and casts. Preferably, transcripts are configured with the ability to reference other transcripts. To this end, in one embodiment, the approach herein leveraging the notion of slots to facilitate midpoint-branching. In this embodiment, and as shown in the graphic on the bottom left, tasks are defined by one or more multi-linear transcripts (with a subset of rows being a task). Slots are configured to swap alternate content into the middle of a linear transcript. Content that fills a slot may have additional slot(s) within, thereby forming recursive branches. Slot-filling content can be written manually, or optionally with AI-assistance. This ability to swap alternate content leverages a transcript item that includes a reference (pointer) to a task in the transcript or in some other transcript. By including such reference(s), each transcript may represent a nested branching structure. As an alternative to explicit use of a slot, the same solution can be realized using tasks and associated references to other tasks.

Threads 208 are non-consecutive sequences of tasks and/or actions therein. A thread typically is recognized over a time horizon. Threads provide a way for an author to constrain tasks configured in the transcript(s), typically by enforcing narrative devices and structure (e.g., coherence, social norms, tension, affinities, memories, and so forth).

Referring back to FIG. 2, according to a further feature, the data set comprising the transcripts 206 and thread 208 is transformed into re-composable combinations of tasks structured as a hierarchical network of tasks (e.g., an HTN). This is represented in FIG. 2 by a Domain Generation operation that creates a World Model, represented by reference numeral 210. The World Model thus represents a (potentially) large multi-modal action domain (LMAD) describing a large number of multi-modal behaviors for a cast of NPCs and other disembodied agents. An individual path in the hierarchical network of tasks represents a "plan" that is a particular implementation of a task that has one or more ways of being implemented and, as noted, typically a task involves multiple agents. As depicted, generation of the World Model completes the content authoring operations for the game.

To facilitate runtime implementation of the authored content, in this embodiment there are two runtime components, namely, a Large Multi-Modal Action Planner (LMAP) 212, and the director 214. Here, both components are cloud-based, which is preferred given the processing complexity involved. The director 214 interacts with the SDK 216 (associated with the game engine) or Rehearsal component 218 to receive the game telemetry in the form of observations occurring in the game and associated world state(s), interfaces to the LMAD and LMAP to determine what the agent(s) should do in response, and returns the necessary control signaling (the one or more cues) to effect the desired actions. To this end, for example, and leveraging the LMAD, the LMAP dynamically generates dialogue options based on the state of the world at the moment the player makes a request for dialogue options. The interaction between the SDK/Rehearsal component and the director is depicted in the call-out graphic that details an Application Programming Interface (API) wherein observations and cast data are delivered from the game environment as API requests, and character cues (dialogue, actions, AI state metadata) and director cues (environmental, such as music, weather, special effects, camera movements, etc.) are delivered from the director as API responses.

As also depicted in FIG. 2, the director 214 manages and leverages a concurrency policy 215. This enables multiple NPCs (or groups thereof) in a cast to act independently of from one another, or to carry out tasks concurrently, or to enable a single NPC to carry out tasks or actions concurrently. More formally, the system implements concurrency control at one or more of a number of different levels: cast-level, plan-level (i.e., top level tasks), task-level, and action-level. As noted above, a cast is a collection of NPCs. According to the cast-level policy 215, preferably casts execute plans concurrently by default. Plan-level policy enables casts to have multiple plans active at one (likely in different domains), enables cast plans to be paused/resumed by the director, enables game code to request plan execution be paused/resumed, enables game code to initiate new planning requests on top of existing ones (via the SDK), and enables game code to terminate plans mid-execution (via the SDK). Task-level policy enables tasks to be executed concurrently (e.g., as sub-tasks under a shared context task), enables the director to schedule concurrent tasks, e.g., according to constraints on shared resources or dependencies between task pre/post conditions, and enables users to specify at a context task level if tasks should be executed in order or concurrently. Action-level policy enables actions within a task to be performed concurrently, enables the director to schedule concurrent actions, e.g., according to constraints on shared resources or dependencies between task pre/post conditions, enables users to specify if a given task method should be executed in order or concurrently, enables users to specify when instances of an action cannot be performed concurrently, enables users to specify when instances of different actions cannot co-occur, and enables users to specify action concurrency constraints specific to a character within a cast. All of these policies are configurable during the authoring phase.

By managing concurrency, where agents perform multiple tasks simultaneously, the director ensures fluid, real-time interactions. Indeed, cast-level behavioral concurrency involving parallel behavior of an entire cast (or subset thereof) of NPCs adds a significant level of complexity, as too many simultaneous actions can overwhelm the player, while too few leave the game world feeling static and unengaging. The approach herein focuses on creating a natural ebb and flow of behaviors that feels intuitive, maintaining immersion while ensuring the game world remain vibrant. As an example of cast-level concurrency, assume the game world depicts an saloon in early America, and wherein there are numerous NPCs, e.g., a piano player, and a bartender. When the player directs a verbal or non-verbal interaction to the piano player, the cast-level concurrency enables the NPC bartender in the background to still perform an action, such as cleaning tables.

Figure 3:
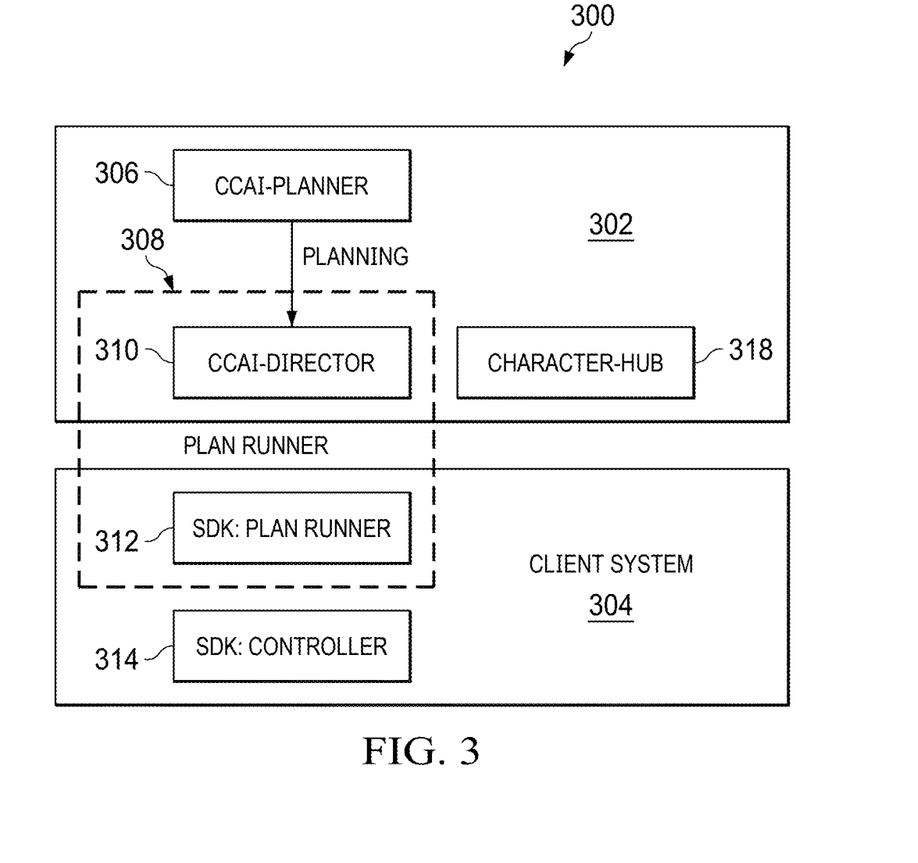
FIG. 3 depicts an example implementation of a network-accessible game control platform according to one embodiment.

Referring now to FIG. 3, a detailed implementation of the runtime components is provided. In this example, a set of components 302 executes in a cloud compute environment, while additional components 304 execute in a client system, e.g., an end user computing device. The cloud-based components comprise a planner service 306, the director service 310, and a character-hub 318 that includes a repository of archetypes, props and actions that are preconfigured for a given domain. The director 310 and an associated SDK-based plan runner 312 together comprise a "Plan Runner," and the client system also runs an SDK controller component 314 that together with the game engine, is responsible for controlling the agents based on the cues provided by the director.

Thus, in the implementation shown in FIG. 3, the planner and director operate as a web service with respect to the client system. Further, the distribution of the Plan Runner across the network (with the director in the cloud and the plan runner in the client) provides advantages, as it enables the heavy computational requirements for the runtime operation to be in the cloud, where more significant processing resources are available. This implementation, however, is not intended to be limiting, as the various components may be re-positioned and/or the functions combined as necessary or desired to support the implementation. In an alternative embodiment, for example, the director 310 is configured to run on-device together with the planer runner 312 and the game engine.

The services depicted in FIG. 3 typically are implemented as software, namely, one or more computer programs comprising program code executing in one or more processors.

The following sections provide additional details regarding the planner and the director components.

Planner

Figure 4:
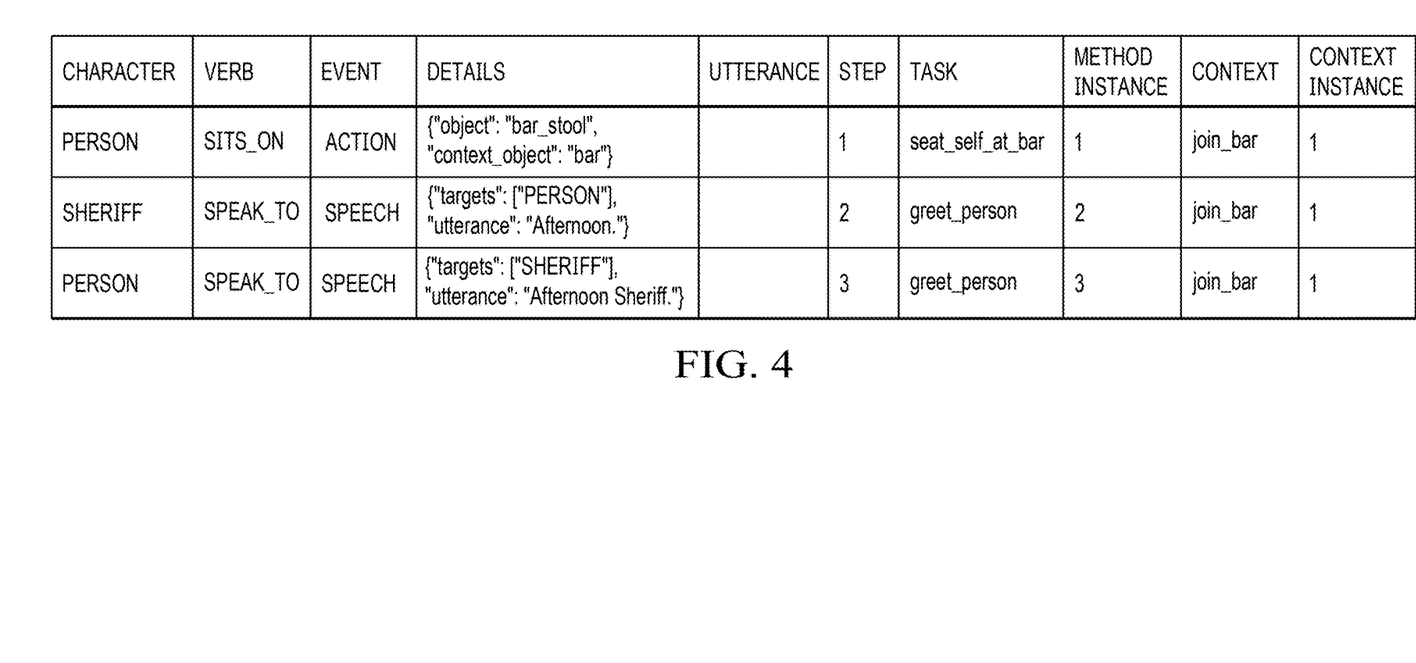
FIG. 4 depicts a representative snippet of an annotated transcript.

By way of additional background, the following terms have the following meanings. A domain is a collection of actions, tasks, and task methods. An action is an operator that the planner can apply to effect some change in its world state. A task is an abstract thing to be accomplished, and they are not specified by a desired world state. Rather, they are defined by their task methods, which are concrete ways to satisfy tasks consisting of actions, dialogue and/or other tasks. In the approach herein, the planner generates HTN domains using examples of desired behaviors. Examples are presented as annotated transcripts, which may be implemented as .csv files, where each row (generically, an item) corresponds to an action, and is annotated with task information. FIG. 4 depicts a representative snippet of an annotated transcript 400 having three (3) such rows. As depicted, a row comprises a set of data fields identified by the column headers: character, verb, EVENT, details, utterance, step, task, method instance, context, context instance. Taken together, [character, verb, EVENT, details] specify an action, e.g. from the first row: "sits_on (character=person, object=barstool, context_object=bar)." Taken together, [task, method instance] specify a lowest level task for the action, namely, the task that is the action's parent in the domain. In this example, and once again from the first row, it is "seats_self_at_bar." Putting these values all together (and recalling that task methods are sequences of actions and tasks that specify how to satisfy some task), in this example the first row by itself defines a method for the task "seat_self_at_bar" which consists of a single "sits_on_action." The context and context instance columns specify what the parent task of the task should be, in this case defining a task method for the task "join_bar" that is the sequence [seat_self_at_bar, greet_person]." In this example embodiment, the HTN domains are three (3) levels deep (context task→task→actions), although this is not a limitation. The context task here does not specify down to the level of actions. Rather, and as noted, the context task method for "join_bar" is literally [seat_self_at_bar, greet person]." The planner can refine these tasks into any suitable methods in the domain, and not just the ones defined in this transcript.

Figure 5:
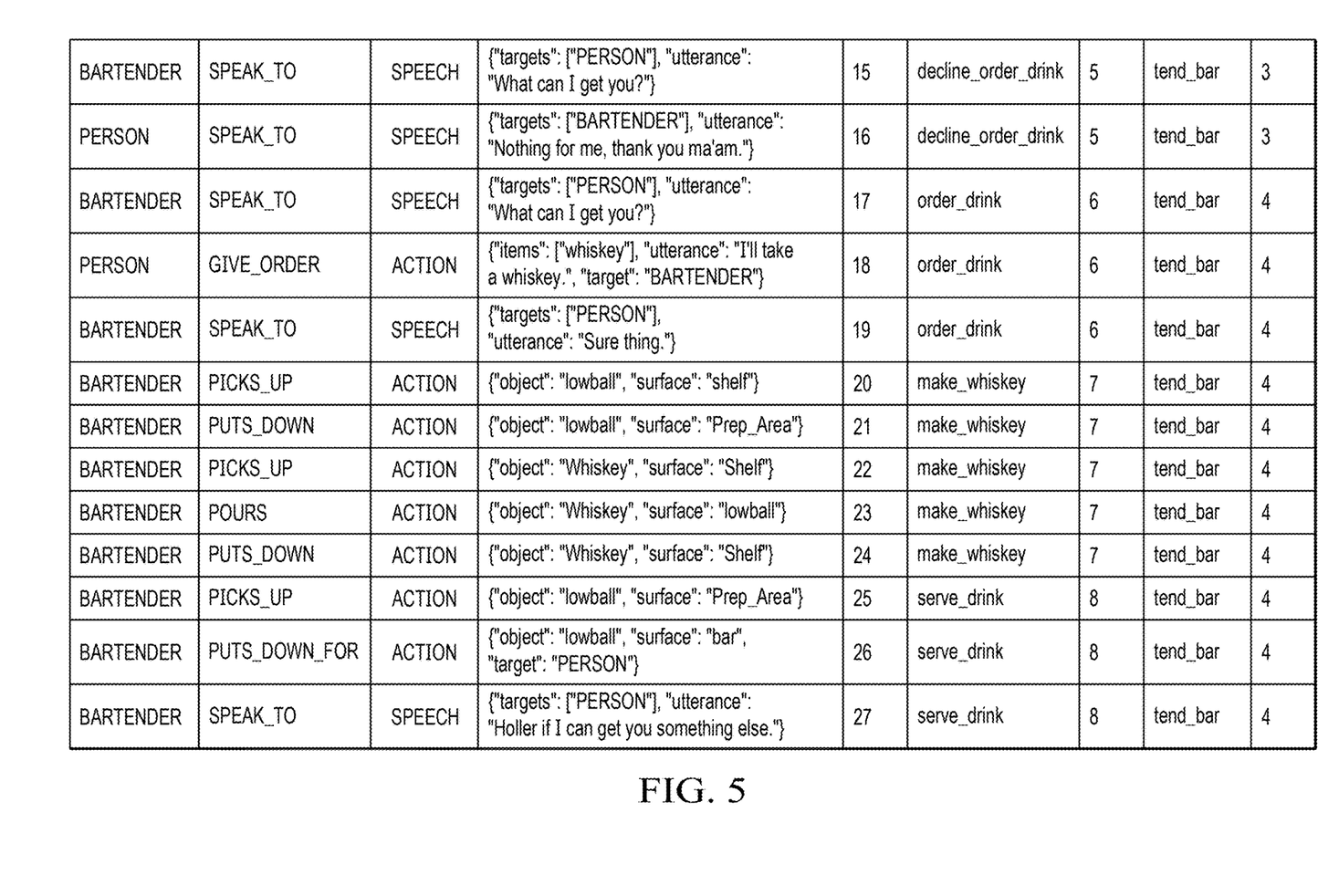
FIG. 5 depicts a full transcript used to define a domain.
Figure 6:
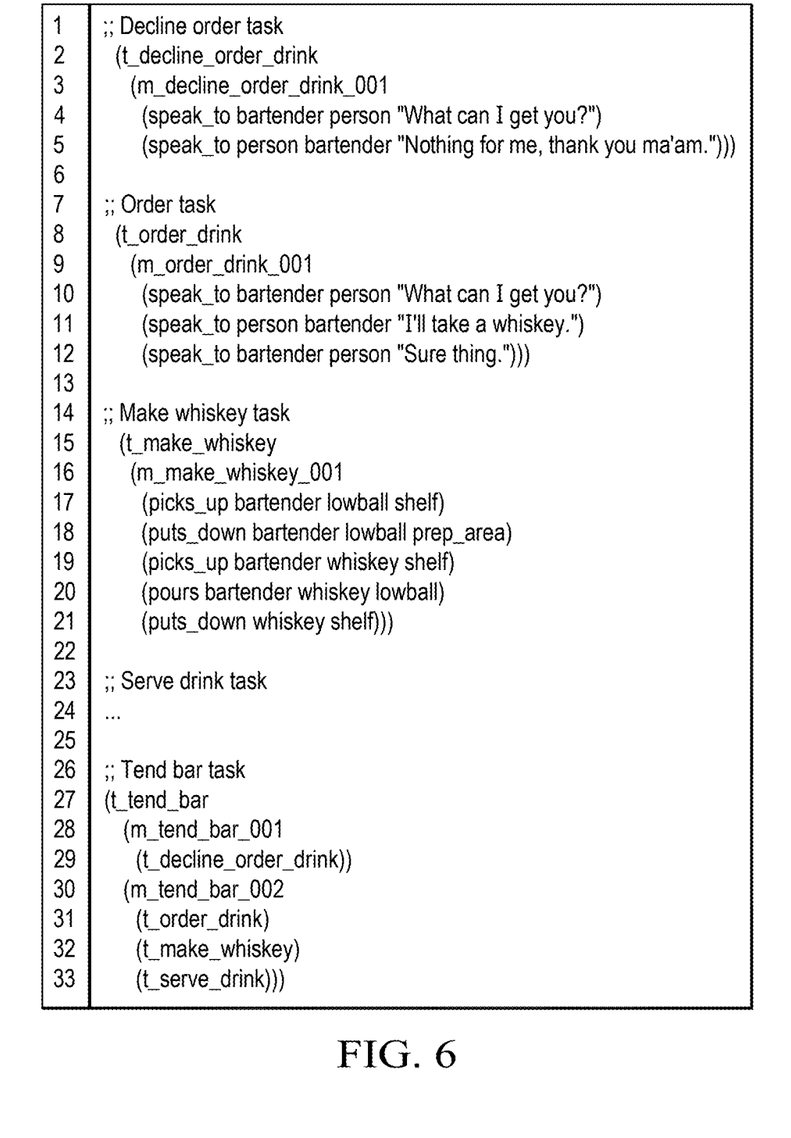
FIG. 6 depicts a representative domain defined from the transcript in FIG. 5.
Figure 7:
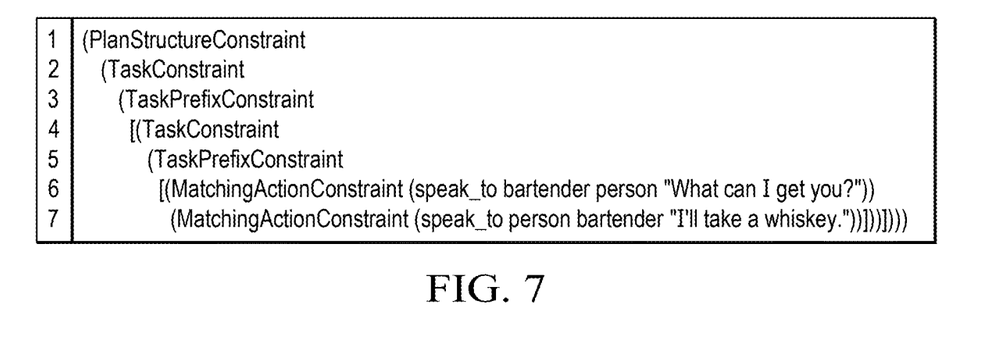
FIG. 7 depicts a set of constraints provided by the director to enable the planner to perform a re-plan operation when an observation event received from the gaming engine is not recognized as being part of a task in a given plan.

Domains are generated by processing each transcript .csv file and gathering up all the tasks and method defined in them. An example domain that is referenced below (by way of example only) is a western saloon. For example, FIG. 5 defines a domain defined from the transcript 500 (the headers are omitted but correspond to those in FIG. 4). FIG. 6 represents a simplified version of the domain 600, shown here as a .json file. Using this domain, and reviewing lines 26-32, an initial plan for new session refines the tend bar task t_tend_bar into either t_decline_order_drink or t_order_drink, which correspond to m_tend_bar_001 and m_tend_ bar_002. If the planner then randomly selects the former, the bartender is then controlled to ask "What can I get you?," in which case the player is expected to response "Nothing for me, than you ma'am." But, if the player actually decides to respond with, say, "I'll take a whiskey," the director will receive an unexpected observation from the game client. In this case, the director sends a request to the planner service to perform a "re-planning" operation, with constraints. FIG. 7 depicts of an example of a set of constraints provided to the planner in this example scenario. More generally, this is the notion of adapting a given plan in response to a determination that an action identified in an observation message received from the gaming engine is not recognized as being part of a task in the given plan. The example constraint says that the planner should give back a plan that is rooted by a task which has a prefix constraint. The prefix consists of a task which itself has a prefix constraint, namely, two actions which correspond to the two actions observed so far in the session. Then, when the planner considers refining t_tend_bar into m_tend_bar_001 and m_tend_bar_001 into t_decline_order_drink and t_decline_order_drink into m_decline_order_drink_001, it will fail to refine the last method into its constituent actions because the action in the method (speak_to person bartender "Nothing for me, thank you ma'am.") does not match the action in the constraint (speak_to person bartender "I'll take a whisky"). Accordingly, the planner ultimately rejects m_tend_bar_001 because there is no way to define it while satisfying the current (re-planned) constraints. It will instead plan into m_tend_bar_002, which does satisfy the constraints.

Preferably, domains are constructed as "forests" rather than single "trees." In this paradigm, each top-level task is independent of all the other top-level tasks, and preferably there is no single task that roots the entire domain. The planner contains a task selector, from which the director service requests next tasks. Preferably, the planner searches for a plan scoped to a single top-level task. Formally, a plan represents a particular implementation of a task that has one or more ways of being implemented. Requests to the task selector (typically sent from the director service) optionally include constraints which specify characteristics that the selected top-level tasks must have, e.g., a first action property. A first action property constraint indicates that for a task to be valid for the requested task selection, it must have at least one task method with a first action that matches the constraints. This facilitates the re-planning with constraints (sometimes referred to as a re-entrant planning) operation previously mentioned.

Dialogue choice is a special cases of a more general mechanism in the planner called "action choice selection." Action choice selection is a process that, given a planning state (roughly speaking, observed actions and world state) and constraints, produce every valid next action that can be planned for. To get the actual dialogue choices, the returned plans are traversed and any actions that are valid dialogue options (has an utterance, correct character, etc.) are extracted.

Summarizing, and as the game session proceeds, the planner service formulates a plan (typically a sequence of actions) for some specified context task, given a world state, and a domain. The planner can re-plan, given a partially observed plan. The planner can search for dialogue options, e.g., by planning in batch, and collecting multiple possible plans. The planner is data-driven, enabling a fluid mix of actions and dialogue into one model. The service is natively multi-agent for group behaviors, including player-agent interactions. Further, the planner is interoperable against any game engine (in which the SDK has been implemented), as well as with text-interaction in the Rehearsal component.

Director

The director service is the cloud-side plan runner component. In particular, and in the example embodiment depicted in FIG. 3, the director is responsible for creating and updating planning sessions, managing and updating the world state for a planning session, managing and updating an observation history, managing and updating task plans for a planning session, and recognizing game events and sending appropriate directions to multiple agents, such as a cast of NPCs. As implemented, the director recognizes and suggests (to the game engine control plane) sequence-based behaviors.

Typically, handling an observation is a two-phase process: (1) try to recognize the observation as a step in an existing task plan or find a task plan to which it can belong, and (2) suggest next actions by examining existing task plans and choosing the most appropriate unobserved action. According to an aspect of this disclosure, the director supports handling of a "cast," which is a collection of interacting NPCs. Preferably, a cast is dynamically managed by the director, and according to the concurrency policy. At a high level, the director manages a list of task to execute in the game world, and tasks are associated with a session. Any number of tasks can be active at once. As described above, the director service responds to request from the SDK associated with the game engine. These requests send observations of actions (physical and dialogue) that have transpired recently, and updates to world state. In response, the director updates its world state to match what has been broadcast from the game engine. The director then performs plan recognition to try to understand (or explain) how the recent observations relate to what the director expected to see happen in the currently active tasks. This is a form of bookkeeping to keep track of what actions have truly been executed so far in each task. If an observation cannot be explained by any of the currently active tasks, then the director can ask the planner to re-plan for each task to see if any task can incorporate the unrecognized observation. If none of the existing tasks can adapt to incorporate the new observation, then the director can ask the planner to plan for a new task that begins with the new observation.

The director includes an action selector that works as follows. After the director has been able to explain the new observation(s), it next needs to select action(s) that should be executed next. These are the cues to send back to the SDK associated with the game engine, and that the game engine uses to control the animated characters in the 3D world. Action selection is responsible for deciding which action of which task should be executed next when there are multiple active tasks to consider. When the director cannot find an action to execute in any of the current tasks, it uses the task selector to detect which context task to execute next. To this end, the task selector iterates over randomly sorted context tasks and tries to formulate a plan for any task whose preconditions pass. Separately, the director supports a thread system component. As intimated above, threads define a loose ordering of tasks and actions that is independent of the domain structure. The director service synthesizes planning constrains from the output of the threads system. As also described, the director implements concurrency via a concurrency policy, which specifies rules for which actions are allowed to execute at the same time. Concurrency enables multiple characters to pursue different behaviors at the same time, and enable each character to talk while executing physical actions or movements in the environment.

The techniques herein provide significant advantages. The authoring tool empowers non-technical designers to create and scale casts of autonomous, multi-agent characters that interact conversationally and physically with each other and their virtual environment. The approach herein increases the amount of creative options and iterations for technical visualization while minimizing the amount of trial and error during production. The amount of time needed for designers to create gameplay is significantly reduced and is achieved without technical resources. The system automates the creation of dynamic animated scenes, and enables real-time adjustments to character behaviors and actions, dialogue, camera angles, audio cues, and the like. Using the authoring environment, narrative designers and animators bring voiced, interactive characters to life easily, and iterate quickly, without programmers. They can author behaviors and dialogue in intuitive text-based tools, all without code or diagrams. Further, the authoring environment enables easy import of existing content, and LLM assistance may be leveraged for content creation. The authoring environment also enables organizing, searching, and revising content at scale.

Using the authoring tool, and leveraging transcripts and threads, narratives that use interruptible characters with memories, affinities toward others, and customizable personality traits, are readily created, tested and implemented in real-time game environments. The director orchestrates multi-agent behaviors for casts of non-playable characters, and the HTN planning approach herein enables the creation of characters who already understand the props and environment, know how to navigate the set, and can express emotions with facial animation and body language. The platform also provides for the ability to test and iterate on gameplay quickly in text-based simulation, before building the complete 3D world. As a result, prototyping and pre-production timelines are significantly reduced.

The following section provides additional details regarding content creation. As noted above, in one embodiment, content creation is facilitated using an authoring tool. A typical implementation of the tool is "as-a-service," with the tool being located at a network-accessible endpoint, e.g., hosted in a cloud computing or other such supporting infrastructure. The tool exposes a graphical user interface by which a permitted user creates a new domain or adds additional content into an existing domain, searches and find domains that have already been configured, defines or configures tasks, etc., as well as to configure testing of the created content.

As noted above, typically content is defined in transcripts, which is the source material used by the planner and director components. In one embodiment, content creation occurs with respect to a domain, either a new domain, or an existing domain. When creating such content, the user uses actions, props and characters that are already defined for use in the domain. In another embodiment, content creators are afforded the ability to add new actions, props, animations and characters.

A domain repository is associated with the authoring tool. Using a search tool, the user can find an existing domain and modify it. To create a new domain, the author may copy an existing one and then modify it accordingly, or start the domain generation process from scratch. As noted, content is added to domains via transcripts. As noted above in the example shown in FIG. 5, typically transcripts are .csv files where each row contains a character (the character who is taking the action), a verb (the action being taken), an event (speech or action), event details (typically .json details), a task (the task label to apply to a sequence), a method instance (that allows the author to specify a sequence of rows that are part of the same task; such rows need not be contiguous), a context (which enables the author to order tasks into a more complicated sequence), and a context instance (which enables the author to specify that the row is part of the same context.

Sequences tagged with the same task label are interchangeable at runtime, and this enables the planner to reconfigure the content to produce more variation at runtime.

Action types represent actions that can used in transcripts. Typically, an action type has a name, a description, and example .json details, e.g., the name "Speak_to" has a description "Speak to someone" and example .json such as {"targets": [BARTENDER] "utterance": UTTERANCE"}.

Threads allow the author to control what content the planner can or cannot plan into. As described above, the planner randomly chooses between different variations of valid tasks. Threads allow the author to specific that certain tasks or actions should unlock or lock based on observations of other tasks or actions. By default, tasks are unlocked and available to the planner, and threads may be used to override this default behavior.

Figure 8:
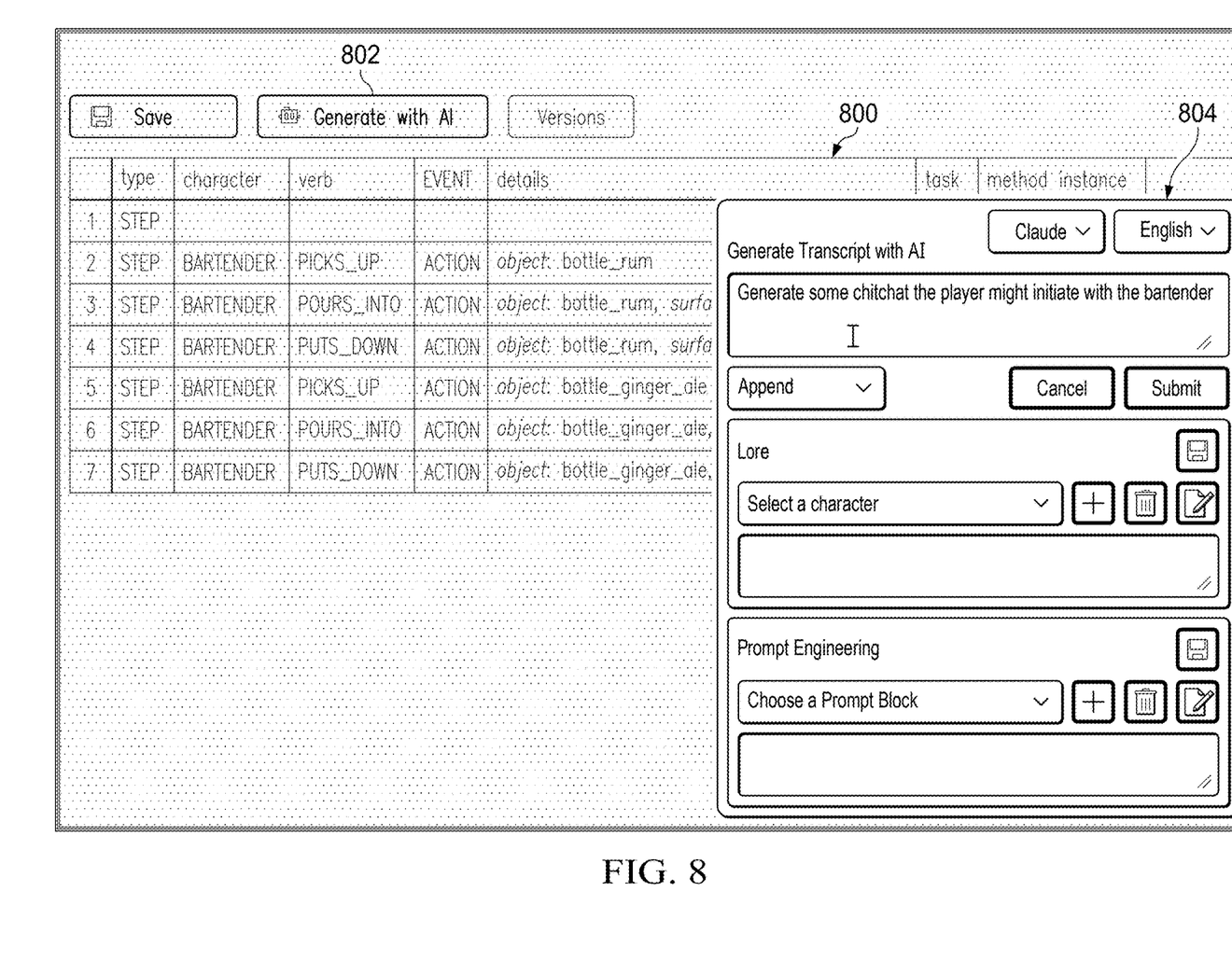
FIG. 8 depicts an AI-supported workflow in the authoring tool.
Figure 9:
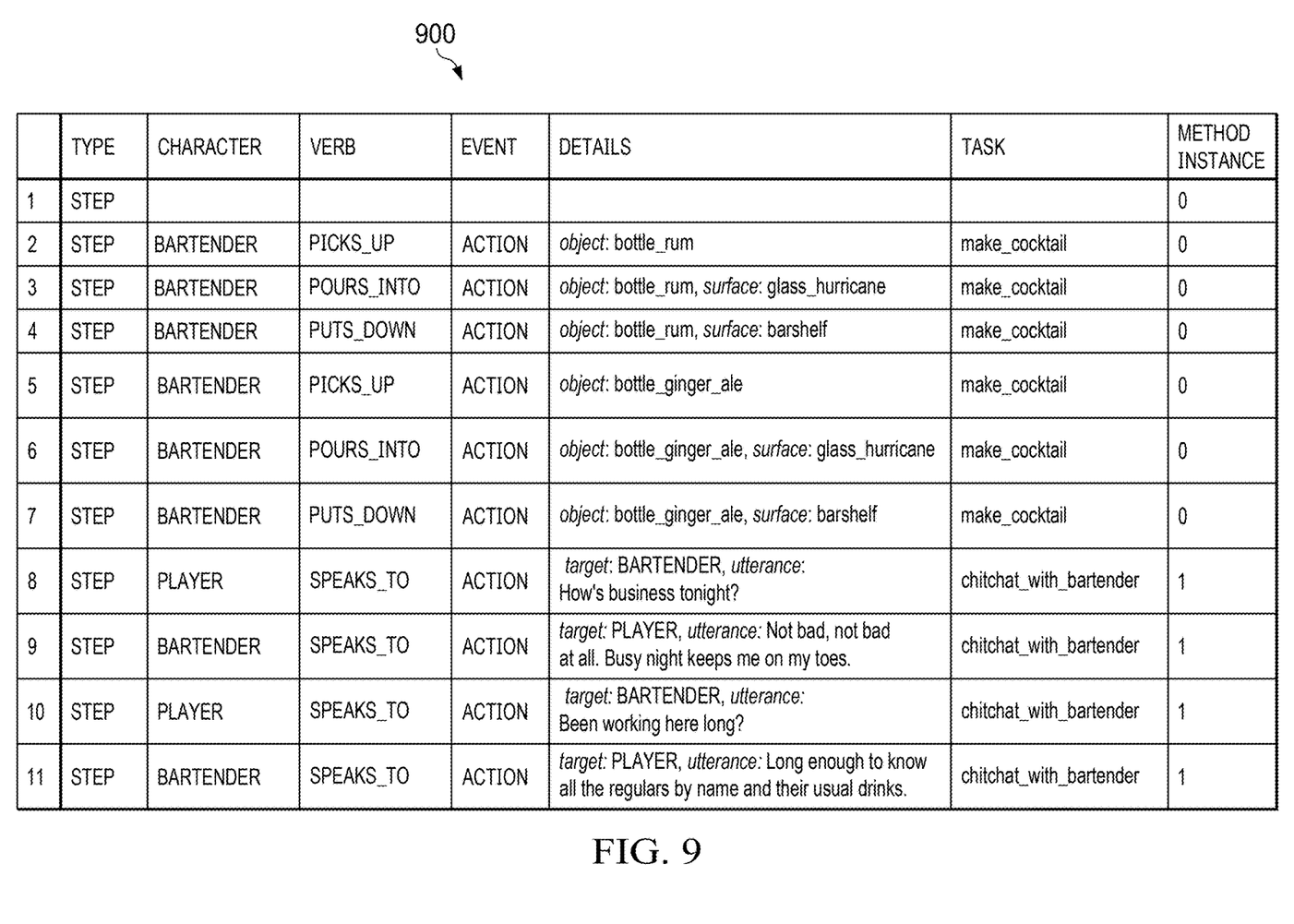
FIG. 9 depicts a modified transcript generated by an AI LLM.

While content creation may proceed manually, this is not a requirement, as the tool may interoperate with an AI such as an LLM. FIG. 8 depicts this operation, wherein a user leverages an AI model to modify a transcript. As shown in the background, and continuing with the western saloon domain example, an existing transcript 800 is available for the domain and defines how a bartender serves a drink. When a user (instead of performing a manual edit) decides to modify the transcript with the AI, he or she selects a "Generate With AI" button 802, which shades the transcript and pops up a modal dialog 804 in which the human designer has entered a prompt, e.g., "generate some chit chat the player might initiate with the bartender." The designer then selects the Submit button, and the authoring tool sends the prompt to the LLM, e.g., Claude. Before the prompt is sent, preferably it is enhanced with additional information, such as the existing transcript so far, and other domain configuration data (e.g., the defined archetypes, actions, and props that are supported by the domain and in content that will be generated). The enhanced prompt may also include information about the structure that the data needs to be in when the response is returned so that it can be seamlessly loaded into the other system elements. FIG. 9 depicts the modified transcript 900 that is generated as a result of the AI prompting. As can be seen, the tool has added four (4) rows to the transcript. These four rows represent adding a new task to the transcript for chit chat with the bartender, as requested in the prompt. As also seen, there is an annotation in the column titled task. In this example, the AI has chosen to annotate with the task label "chitchat_with_bartender." A user may edit this label.

The above example use case (AI-based transcript editing or augmentation) is not intended to be limited, as AI may be used for other content authoring. An LLM of this type may be used for other purposes, such as to generate new tasks, to rewrite a variation of a task, to translate a task into a different language, to author a task from a concrete reference (such as a movie script), and others. As another example, a user may leverage an AI interface such as described above to build an HTN planning domain from a set of transcripts. This process would look at the annotations to understand how to parse transcripts into tasks.

Without intending to be limiting, when the authoring tool leverages an AI model, typically this is implemented via an API to the LLM. The language model may also be trained and supported locally to the authoring tool.

An additional benefit that is provided by the authoring tool and methods herein is that the content being created need not be specifically tailored or bound to an NPC. Rather, transcripts define role-based interactions, wherein each role may be bound to a human player or an NPC. As such, the content generation is highly flexible in that it can adapt to (and without change be reused in) different cast compositions and in-game situations. With respect to an NPC, a piece of content is used (in the manner described herein) to enable orchestration of what the character does; in contrast, and with respect to a real player, that same piece of content is used to infer the behavior of that player so that the system knows what the NPC(s) around it should do.

While content authoring may be carried out as described (including with generative AI-support), the authoring tool may also be provided with a content library of preconfigured domains, with a domain having a defined set of archetypes, actions and props. An archetype is a character's defined role in the world of the game (e.g., sheriff, bartender, or the like), and predefined behaviors for that character. This information is made up from transcripts and associated tasks, all as previously described, and the authoring tool provides an editor to facilitate changes to the preconfigured information. In an alternative embodiment, the content library is provided in association with the game platform, and the game editor may be used to augment, edit or modify this information.

Enabling Technologies

The authoring web tool of this disclosure may be implemented with a React js frontend, using ReactGrid, and a Rust API backend using axum.

The planner is adapted from GT-Pyhop and is written in Python.

The cloud-based components depicted in FIG. 3 may be hosted in a cloud computing environment, such as Amazon™ Web Services (AWS).

Aspects of this disclosure may be practiced, typically in software, on one or more machines or computing devices. More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a stand-alone machine, or across a distributed set of machines. A computing device connects to the publicly-routable Internet, an intranet, a private network, or any combination thereof, depending on the desired implementation environment.

One implementation may be a network-accessible computing platform. One or more functions of the computing platform may be implemented in a cloud-based architecture. The platform may comprise co-located hardware and software resources, or resources that are physically, logically, virtually and/or geographically distinct. Communication networks used to communicate to and from the platform services may be packet-based, non-packet based, and secure or non-secure, or some combination thereof, Each above-described process or process step/operation preferably is implemented in computer software as a set of program instructions executable in one or more processors, as a special-purpose machine.

Representative machines on which the subject matter herein is provided may be hardware processor-based computers running an operating system and one or more applications to carry out the described functionality. One or more of the processes described above are implemented as computer programs, namely, as a set of computer instructions, for performing the functionality described. Virtual machines may also be utilized.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a non-transitory computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

There is no limitation on the type of computing entity that may implement a function or operation as described herein.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The functionality may be co-located or various parts/components may be separately and run as distinct functions, and in one or more locations over a distributed network.

Computing entities herein may be independent from one another, or associated with one another. Multiple computing entities may be associated with a single enterprise entity, but are separate and distinct from one another.

Code snippets depicted herein are © Bitpart.ai.

What is claimed is:

1. A method associated with a game platform, comprising:
responsive to an input, receiving a data set representing one or more transcripts, wherein a transcript represents a portion of a narrative and comprises a set of one or more items, with each item in the transcript comprising one of: an action, a line of dialogue, a reference to a task in the transcript or in some other transcript, and combinations thereof, wherein a task is a subset of the set of one or more items;
transforming the data set into re-composable combinations of tasks structured as a multi-modal hierarchical network of tasks, wherein an individual path in the hierarchical network of tasks represents a plan that is a particular implementation of a task that has one or more ways of being implemented; and during a session of a game being controlled by a game engine associated with the game platform and involving a player, real-time orchestrating behaviors of one or more non-player agents by receiving a set of observations occurring in the game and, in response, implementing a set of one or more plans in the hierarchical network of tasks, wherein orchestration occurs remotely from the game engine;

wherein orchestrating behavior of a given agent includes receiving an observation message representing a game event, searching the multi-modal hierarchical network of tasks to identify a particular plan, based on the identified particular plan, generating a set of one or more cues, and providing the set of one or more cues to control the game engine in real-time.

2. The method as described in claim 1, wherein the one or more agents are a cast of Non-Player Character (NPC) agents.

3. The method as described in claim 2, wherein at least first and second of the NPCs in the cast act independently from one another.

4. The method as described in claim 2, wherein at least first and second of the NPCs in the cast carry out tasks concurrently.

5. The method as described in claim 2, wherein at least first and second groups of the NPCs in the cast carry out tasks concurrently.

6. The method as described in claim 2, wherein a given NPC in the cast carries out first and second tasks concurrently.

7. The method as described in claim 1, wherein at least one plan is a multi-modal plan that includes both physical actions and character dialogue.

8. The method as described in claim 1, further including continuously tracking a world state of the game during game session and maintaining an observation history comprising an ordered list of observation events that have been observed in the game.

9. The method as described in claim 1, further including adapting the particular plan in response to a determination that an action identified in an observation message received from the gaming engine is not recognized as being part of a task in the particular plan.

10. The method as described in claim 1, wherein the data set is transformed by annotating a set of items in one or more transcripts.

11. The method as described in claim 1, wherein the data set also includes a set of one or more threads, wherein a thread enforces one or more constraints on implementation of one or more tasks.

12. The method as described in claim 1, further including executing the game session as a simulation external to a 3D world rendered by the gaming engine.

13. The method as described in claim 1, wherein the input is one of: a script, a game design document, a generative AI-authored or assisted narrative, and combinations thereof.

14. The method as described in claim 2, wherein behaviors of the cast of NPCs are carried out independent of control of the player and optionally one or more other players operating in a 3D world rendered by the gaming engine.

15. An apparatus, comprising:
at least one hardware processor; and
computer memory holding computer program instructions executed by the hardware processor, the computer program instructions comprising program code configured to:
receive a data set representing one or more transcripts, wherein a transcript represents a portion of a narrative and comprises a set of one or more items, with each item in the transcript comprising one of: an action, a line of dialogue, a reference to a task in the transcript or in some other transcript, and combinations thereof, wherein a task is a subset of the set of one or more items;
transform the data set into re-composable combinations of tasks structured as a multi-modal hierarchical network of tasks, wherein an individual path in the hierarchical network of tasks represents a plan having a starting point and that represents a particular implementation of a task that has one or more ways of being implemented; and
during a session of a game being controlled by a game engine associated with the game platform and involving a player, real-time orchestrate behaviors of one or more non-player agents by receiving a set of observations occurring in the game and, in response, implement a set of one or more plans in the hierarchical network of tasks, wherein orchestration occurs remotely from the game engine;
wherein orchestrating behavior of an given agent includes receiving an observation message representing a game event, searching the multi-modal hierarchical network of tasks to identify a particular plan, based on the identified particular plan, generating a set of one or more cues, and providing the set of one or more cues to control the game engine in real-time.

16. The apparatus as described in claim 15, wherein the game platform is network-accessible.

17. The apparatus as described in claim 16, wherein the one or more non-player agents are a cast of Non-Player Character (NPC) agents, and wherein the program code configured to orchestrate behaviors of the cast of NPC agents is located in a cloud computing infrastructure remote from a machine on which the game engine executes.

18. The apparatus as described in claim 16, wherein the program code further includes an authoring tool configured to transform the data set.

19. A computer program product comprising a non-transitory computer-readable medium the computer program product comprising program code executable in one or more hardware processors to control non-player agents in a game, the program code configured to:
real-time orchestrate behaviors of one or more non-player agents by receiving a set of observations occurring in the game and, in response, implementing a set of one or more plans in a multi-modal hierarchical network of tasks, the hierarchical network of tasks having been generated from one or more transcripts, wherein a transcript represents a portion of a narrative and comprises a set of one or more items, with each item in the transcript comprising one of: an action, a line of dialogue, a reference to a task in the transcript or in some other transcript, and combinations thereof, and wherein a task is a subset of the set of one or more items, wherein orchestration occurs remotely from the game engine;
wherein orchestrating behavior of an given non-player agent includes receiving an observation message representing a game event, searching the multi-modal hierarchical network of tasks to identify a particular plan, based on the identified particular plan, generating a set of one or more cues, and providing the set of one or more cues to control a game engine in real-time.

20. The computer program product as described in claim 19 wherein the program code is further configured to adapt the particular plan in response to a determination that an action identified in an observation message received from the gaming engine is not recognized as being part of a task in the particular plan.

* * * * *